United States Patent
Arora et al.

(10) Patent No.: US 6,629,232 B1
(45) Date of Patent: Sep. 30, 2003

(54) COPIED REGISTER FILES FOR DATA PROCESSORS HAVING MANY EXECUTION UNITS

(75) Inventors: Ken Arora, Los Gatos, CA (US); Harshvardhan Sharangpani, Santa Clara, CA (US); Rajiv Gupta, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 194 days.

(21) Appl. No.: 09/609,911

(22) Filed: Jul. 3, 2000

Related U.S. Application Data

(63) Continuation of application No. 09/434,070, filed on Nov. 5, 1999, now abandoned.

(51) Int. Cl.[7] .............................................. G06F 13/00
(52) U.S. Cl. ........................................ 712/29; 712/23
(58) Field of Search ............................ 712/23, 29, 24; 711/5, 149, 150, 168

(56) References Cited

U.S. PATENT DOCUMENTS

| | | | | |
|---|---|---|---|---|
| 5,301,340 A | * | 4/1994 | Cook | 712/24 |
| 5,574,939 A | * | 11/1996 | Keckler et al. | 712/200 |
| 5,644,780 A | * | 7/1997 | Luick | 711/127 |
| 5,826,096 A | * | 10/1998 | Baxter | 712/215 |
| 6,219,777 B1 | * | 4/2001 | Inoue | 712/10 |
| 6,282,585 B1 | * | 8/2001 | Batten et al. | 710/20 |

* cited by examiner

*Primary Examiner*—Eric Coleman
(74) *Attorney, Agent, or Firm*—Schwegman, Lundberg, Woessner & Kluth, P.A.

(57) ABSTRACT

Interconnect-dominated large register files are reduced in chip area and delay time. A register file in a processor having a number of execution units is divided into multiple copies. Different groups of execution units can read from and write to their own copy of the file registers by a set of local read and write ports. All of the register-file copies are synchronized by writing data from the execution units to remote write ports in at least some registers in other copies of the register file. Each copy can be divided into local and global registers. While all copies of the global registers continue to be written by the remote write ports, the local registers can be written only by a local cluster of execution units. Alternatively or additionally, all of the execution units can write to their local register-file copy, but only some of the units can write the global registers in all copies of the register file.

29 Claims, 5 Drawing Sheets

COPIED REGISTER FILES FOR DATA PROCESSORS HAVING MANY EXECUTION UNITS

This application is a continuation of U.S. patent application Ser. No. 09/434,070, abandoned, filed Nov. 5, 1999.

TECHNICAL FIELD OF THE INVENTION

The present invention relates to electronic data processing, and more specifically concerns an organization for general-purpose register files in superscalar or very long instruction word (VLIW) processor architectures having a large number of execution units connected to the same registers.

BACKGROUND OF THE INVENTION

Semiconductor process trends indicate that transistor gate delays are decreasing at a rate significantly faster than signal-transmission delays through the conductors joining the transistors. As a result, the cycle time of the next generation of microprocessor chips will be increasingly limited by interconnection hardware structures, rather than by transistor structures as in the past.

One important structure required by all microprocessors is a file of general-purpose or architectural registers. Register files in modern processors, especially those in superscalar, VLIW, and other regularized architectures, are dominated both in timing and in chip area by the metal interconnections required for data and address lines. This situation becomes even worse because of the increasing parallel-execution width of present and future designs—because of the larger number of instructions that can be executed in parallel. The importance of interconnect area and delay in large regular structures such as register files has not been appreciated in the past.

Some approximations employed in the industry characterize chip real estate by a small set of parameters: the number of registers in a register file, the size (number of bits) of each register, and the number of ports in the register file, usually three or four times the execution width of the processor. Parallel-execution width depends upon the particular computer technology, but wider is better to exploit instruction parallelism. The number of bits in each register is dictated by architectural considerations. The area of a large, metal-limited register file increases roughly linearly with the number and size of the registers, but rises much faster with the number of ports. The latency or delay time of a register file is also roughly proportional to the number of ports. That is, the large register files required by modern architectures and allowed by new transistor technology reach a state of diminishing returns with respect to the number of ports in a register file.

In order to obtain maximum benefit from the latest semiconductor processes, which speed up transistors more than interconnects, microprocessor designers desire to limit performance by transistor-dominated structures rather than by metal-dominated ones. That is, the register file must be taken off the critical path that limits the performance of the entire processor. The desire for wider machines with increased parallelism, however, exacerbate the register-file problem by growing the register file much more than linearly. Thus, there is a pressing need for highly ported register files that are less dominated by their interconnection area and latency time.

SUMMARY OF THE INVENTION

The invention employs multiple copies of a register file in a processor having a number of execution units that access the register file. Each group of execution units can read from and write to its own copy of the file registers by a set of local read and write ports. In addition, all of the register-file copies are synchronized by writing data to remote write ports in the other copies of the register file. The interconnections between the execution units and the register-file copies thus grow less rapidly than they otherwise would, and the difference becomes greater as the execution width of the machine increases.

In one embodiment, not all of the registers are writable by the remote write ports. Each file copy is divided into local and global registers. While all copies of the global registers continue to be written by the remote write ports, the local registers can be written only by a local cluster of execution units. Other embodiments divide the registers into global and local according to other criteria.

DETAILED DESCRIPTION OF THE INVENTION

The description below shows by way of illustration specific embodiments of the present invention. These embodiments are shown in sufficient detail to enable those skilled in the art to practice the invention. Structural, logical, and procedural modifications within the scope of the invention will occur to those in the art. The description is therefore not to be taken in a limiting sense, and the scope of the invention is defined only by the appended claims.

Figure 1:
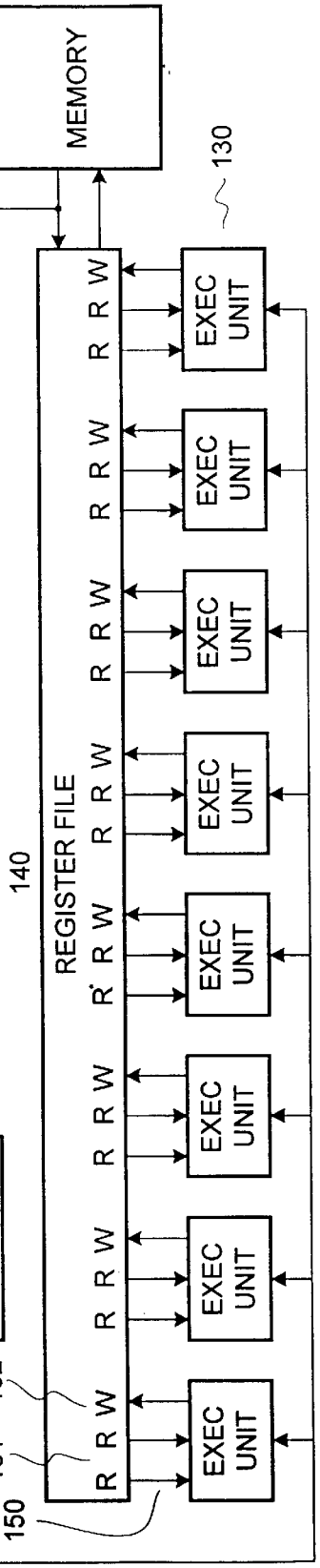
FIG. 1 is a high-level block diagram of a prior-art superscalar processor system.

FIG. 1 is a high-level block diagram of a typical superscalar or VLIW processor 100. Memory 110, which can include on-chip cache memory, off-chip cache, system memory, and even storage devices such as disk drives, couples to an instruction decoder 120 and to a number of parallel execution units 130. The term 'execution unit' must be given a broad meaning; anything that sends data to and/or receives data from the register file will profit from the invention.

Memory 110 also reads data from and writes data to register file 140. Although 25 FIG. 1 shows only a single register file, a typical processor has several: usually at least one for integer operands and addresses (typically 32 bits or more) and one for floating-point operands (64 bits or more). Register file 140 interacts with execution units 130 via interconnections 150 in any conventional manner. Each execution unit in this example has two read ports R and one write port W into the file, so that any unit 130 can read two operands from two different registers, perform an operation on them, and return the result to a third register. That is, any execution unit can access up to three different registers in the file at essentially the same time by interconnections 151 to two read ports and 152 to one write port associated with that unit. The single lines between the units and the register file carry both data and the address of a register. A typical system might have eight execution units, each having three ports, feeding a file of 128 registers each having 65 bits.

Figure 2:
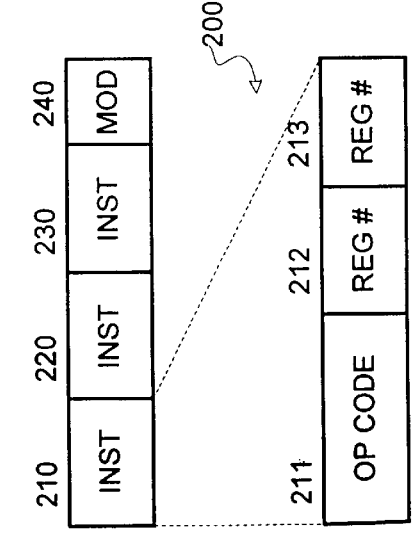
FIG. 2 illustrates an instruction-word format for superscalar processors.

FIG. 2 depicts one of many ways to encode an instruction word 200 for an illustrative superscalar processor, purely for purposes of illustration. Multiple complete instructions 210–230 occupy this word. Some processors include additional information, data, or instruction modifiers such as 240. The present invention can be used with any type of instruction format. Decoder 120 routes instructions 210–230 to certain ones of the execution units 130, either by an internal scheduling algorithm or in response to external directives such as data in field 240. The individual instructions typically contain a conventional opcode 211 and operand specification fields 212–213. In register-oriented architectures, almost all operations take place by reading one or more operands from certain of the architectural registers in file 140, then writing a result either explicitly to another register in the file or implicitly to one of the operand registers or to a specific register.

Figure 3:
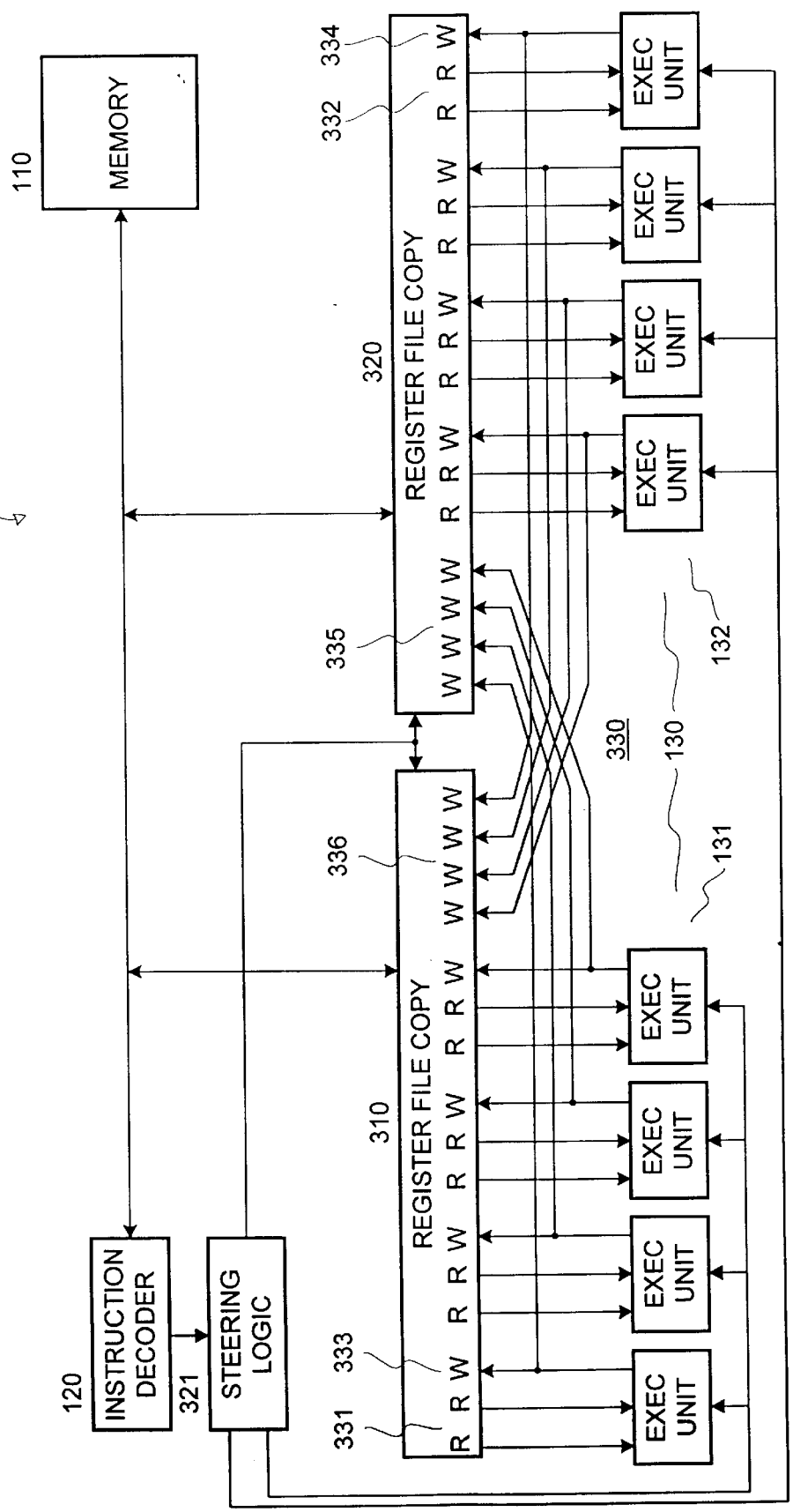
FIG. 3 is a block diagram of a superscalar processor having a register file according to the invention.

FIG. 3 is a block diagram of a machine 300 having the same register capabilities as system 100, but having a register file configured according to the invention. For purposes of illustration only, the eight execution units 130 are divided into two clusters 131 and 132 of one or more units each. This example has four units in both of the clusters. Steering logic 321 responds to information from decoder 120, and from other conventional sources, to determine which cluster each instruction is transmitted to for execution.

Each cluster is associated with its own copy of the entire register file. That is, using the illustrative numbers above, file copy 310 has a full complement of 128 registers of 65 bits each, and file copy 320 also contains a full 128 registers of the same size. Steering logic 321 routes data to and from memory 110. Data is written to both copies and read from both copies in parallel.

All of the execution units 130 use the same set of addresses, e.g., 0–127, to select particular registers in their own register file copy for reading, and in both copies for writing data over interconnections 330. Each execution unit in the first cluster 131 has local read interconnections, exemplified at 331, for carrying register addresses to register file copy 310, and for reading data from the addressed registers back to the first-cluster execution units. Units in the other cluster 132 have similar local read interconnections 332. Each unit in cluster 131 also has a local write interconnection 333 for sending addresses and data to register-file copy 310 for writing to a particular register. Local write wiring 334 serves the same purpose for register-file copy 320.

Writing data to registers is the only operation by which the two register-file copies could possibly ever become unsynchronized with each other. External data is written to both copies in parallel, and read operations by units 130 do not alter the contents of a register. The present invention provides execution units 131 with another set of interconnections 335, called remote write connections, that lead to the other copy 320 of the register file, for the purpose of synchronizing write operations between the two copies. While local write connections 333 present data and addresses to the local register-file copy 310, connections 335 present the same full set of addresses and data in parallel to the remote register-file copy 320. Remote write connections 336 serve the same purpose where register-file copy 320 is the local copy and register-file copy 310 is the remote. That is, remote write connections 335 and 336 preserve the synchrony of both register-file copies, so that each contains exactly the same data at all times.

Duplicating structures as large as entire register files may seem extravagant of chip area and possibly of delay time as well. However, this is not so. Copying the entire register file reduces both the total chip area and the latency time. According to the chip-area approximations mentioned above, increasing the number of execution units in each cluster increases this advantage, as does raising the number of clusters, in many practical configurations.

Figure 4:
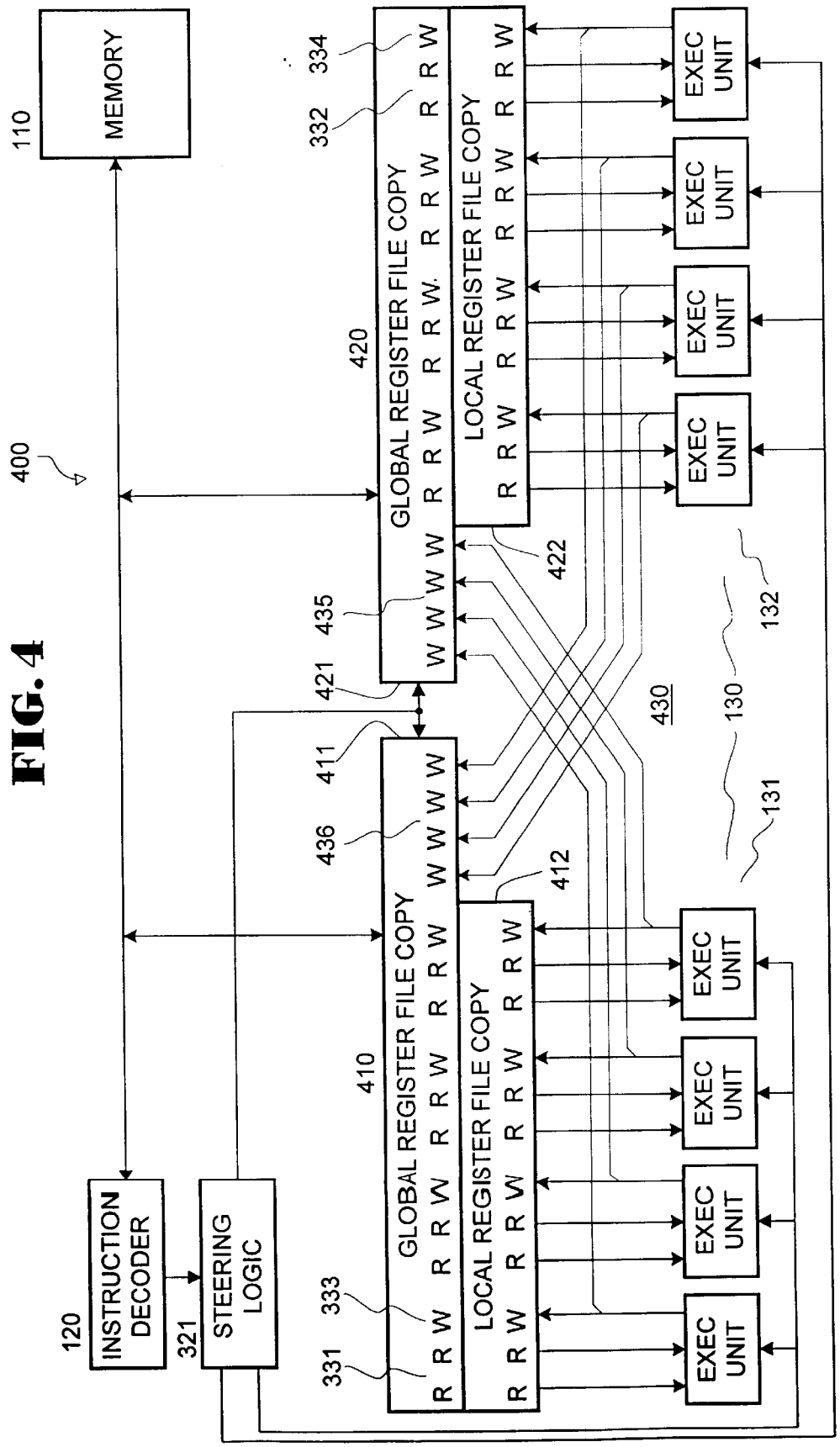
FIG. 4 shows a variation of the register file of FIG. 3.

FIG. 4 is a block diagram of a configuration 400 for achieving even greater savings in chip area and latency. This illustrative configuration also has eight execution units, each capable of addressing 128 registers of 65 bits each. Memory 110, instruction decoder 120, and steering logic 321 remain the same.

System 400 divides register-file copy 410 into two sets of registers, a global set 411 and a local set 412. Copy 410 has, in this example, the same overall number of registers and the same register size as copy 310, FIG. 3. The local read interconnections 331 are the same, as are the local write connections 333. That is, each execution unit 131 can read data from all registers, 0–127 via wiring 331, and can write data from all 128 registers via wiring 333.

The remote write interconnections 435 differ from the corresponding wring 335 of FIG. 3. In FIG. 4, remote write connections 435 carry only the addresses of the global registers in set 411 to register-file copy 420. For example, suppose that a specific implementation designates the 32 registers at addresses 0–31 to be global registers in set 411, and the 96 registers at the remaining addresses 32–127 to be local registers 412. Therefore, while local write connections 333 carry 128 addresses, remote write connections 435 need carry only 32 addresses to copy 420. The connections for execution-unit cluster 132 mirror those for cluster 131. Specifically, remote connections 436 carry only addresses 0–31 from copy 420 to copy 410. That is, only global registers 421 (at addresses 0–31) of copy 420 are outfitted with the extra ports connected at 435, just as only subset 411 of the registers in copy 410 are connected to extra write ports at 436. The local registers 416 (at addresses 32–127) only connect via local read ports via wiring 332 and local write ports via wiring 334 to the execution units in cluster 132.

The savings of configuration 400 over that of FIG. 1 is greater than that of FIG. 3 over FIG. 1. Latency time also benefits. Again, these savings increase for larger numbers of clusters per machine and execution units per cluster. The savings in both chip area and delay time also increase as the number of local registers becomes significantly greater than the number of global registers.

The global/local split technique confers other advantages as well. Dividing each register-file copy into a global part 411, 421 and a local part 412, 422 greatly increases the number of registers available to a programmer. Continuing the foregoing examples, systems 100 and 300 provide 128 registers, whereas system 400 provides 32+2×96=224 registers. Increasing the number of registers allows the microprocessor's compiler to keep more data items in the register file, reducing both memory bandwidth requirements and program-execution delays because of memory-access latency. More clusters, or a smaller fraction of global registers, would provide even more registers. The microprocessor's compiler must of course allocate operands to registers in view of this split. Compilers for superscalar processors already allocate instructions to long instruction words and achieve many other complex functions required by the overall architecture of such machines. Therefore, the burden of keeping track of local and global registers is not excessive. The register files are shown as being symmetric; that is, there are no restrictions upon whether a source or destination register must be either global or local. It might be desirable to impose restrictions at an architectural level, such as requiring that a global source register come from a first read port. It might also be desirable to reduce the total number of ports by imposing restrictions at the implementation level. For example, either system hardware or a compiler could break up instruction packages sent to a cluster in any given clock cycle such that only two instructions can target the same global destination register.

Figure 5:
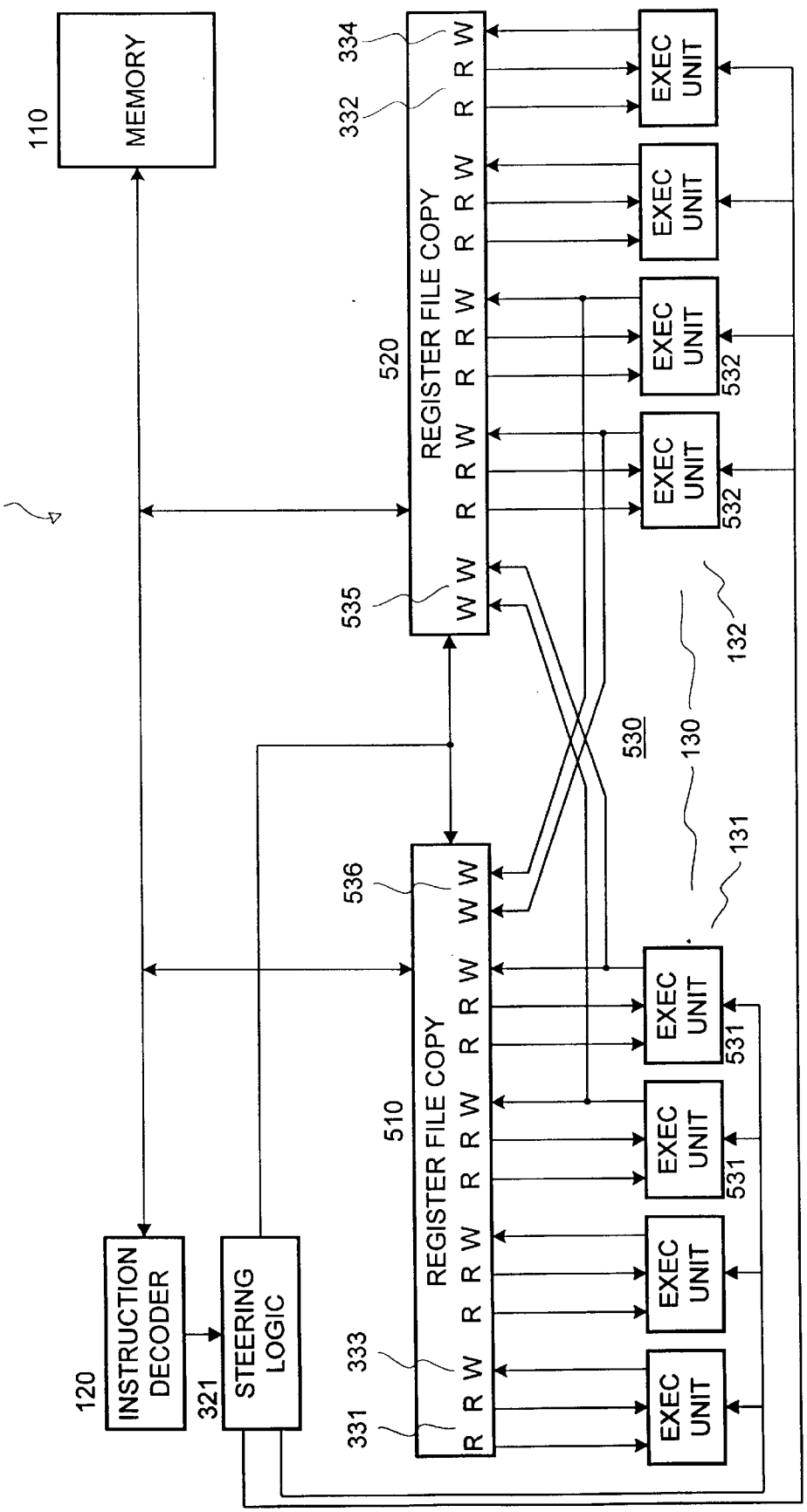
FIG. 5 shows another embodiment of the invention.

FIG. 5 shows another embodiment of the invention. System 400 divides the local from the global registers according to the addresses of the registers. That is, only certain registers 411, 421 include remote write ports 436, 435 from the execution units in the non-local cluster 132, 131. System 500, however, divides them up according to execution unit, rather than according to register address. Only two execution units 531 in the cluster 131 of four units have remote write ports 535 in register-file copy 320. Likewise, only two units 532 in cluster 132 have remote write ports 536 in copy 310. Therefore, all of the execution units in each cluster can write to all of the registers in their own local copy of the register file, but only some of the execution units in that cluster can write to all of the registers in the remote copy of the register file.

Figure 6:
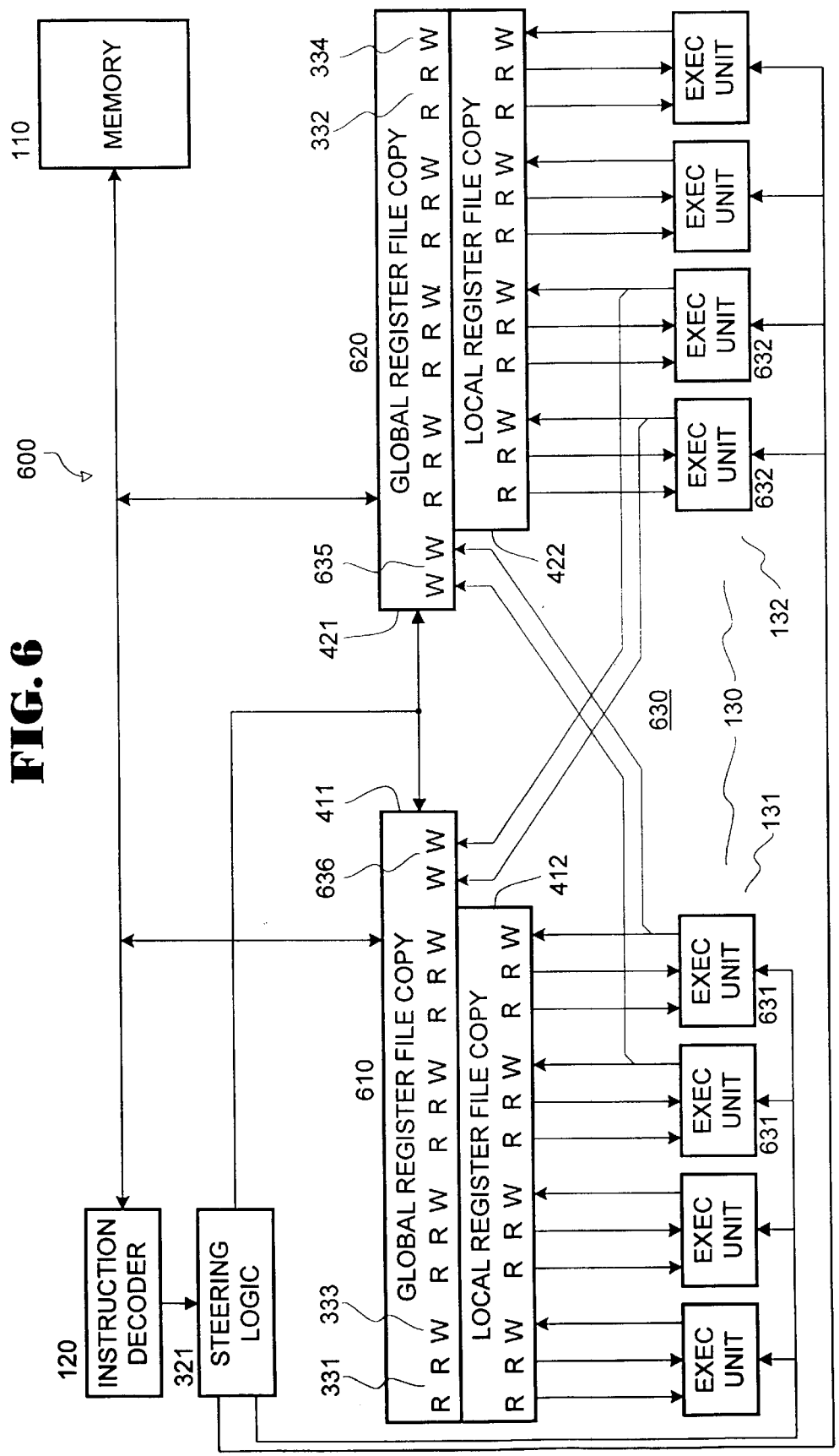
FIG. 6 shows a variation of the embodiment of FIG. 5.

FIG. 6 shows a system 600 that combines the features of systems 400 and 500. In system 600, only certain execution units 631 have remote write ports 635, but these connect only to those registers in remote copy 420 that have certain addresses. Likewise, only certain units 632 have remote write ports 636 to only certain ones of the registers in their remote copy 420. So all of the execution units in each cluster can write to all registers in their local register-file copy, but only some of the execution units in that cluster can write to only some of the registers in the remote copy. Local and global register files can also be created according to other criteria, if desired.

Figure 7:
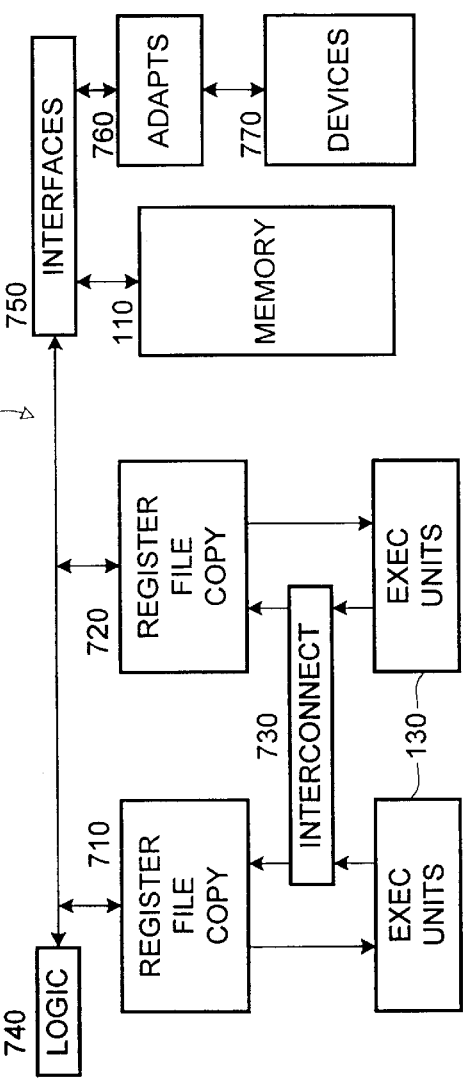
FIG. 7 is a high-level diagram of a system incorporating the invention.

FIG. 7 shows a larger system 700 incorporating the invention. Register-file copies 710 and 720 represent register-file copies 310–320, 410–420, 510–520, or 610–620. Also, more than two copies of a register file are possible, and it is straightforward to incorporate multiple register files, each having copies according to the invention, into a microprocessor or other data-processing unit. Interconnect 730 represents the wiring patterns 330–630 between copies 710, 720 and execution units 130. Logic 740 subsumes decoder 120, steering logic 321, and the other conventional circuits of a processing unit. Interfaces 750 couple data, instruction, and control signals to other units of system 700, including system memory 110 and adapters 760. Interfaces 750 may include one or more system buses. Adapters 760 connect to input/output devices such as offline storage, keyboards, displays, and modems.

CONCLUSION

The above description shows an implementation of register files in a microprocessor having multiple execution units. Although only one register file was described, a typical processor will have two large register files, and possibly more. A register file can have more than the two copies illustrated herein. The present invention is also useful in other settings where a large, interconnection-dominated integrated-circuit structure must couple to a number of other units at high speed.

Therefore, the scope of the invention is to be measured only by the following, in which we claim:

1. A data processing system, comprising:
 a plurality of execution units;
 a first register-file copy having read ports and local write ports coupled to a first cluster of the execution units, and having remote write ports coupled to a second cluster of the execution units such that at least one unit in the first cluster is adapted to read from only the first copy and to write to both copies;
 a second register-file copy having read ports and local write ports coupled to the second cluster of the execution units, and having remote write ports coupled to the first cluster of the execution units such that at least one unit in the second cluster reads from only the second copy and writes to both copies.

2. The data processor of claim 1 where the same external data is written into all of the registers of each register-file copy.

3. The data processor of claim 1 where the remote write ports of only some of the registers in the first register-file copy are coupled to the execution units in the second cluster, and where the remote write ports of only some of the registers in the second register-file copy are coupled to the execution units in the first cluster.

4. The data processor of claim 3 where the remote write ports of the registers in the first register file copy are coupled to only some of the execution units in the second cluster, and where the remote write ports of the registers in the second register file copy are coupled to only some of the execution units in the first cluster.

5. The data processor of claim 1 where the remote write ports of the registers in the first register file copy are coupled to only some of the execution units in the second cluster, and where the remote write ports of the registers in the second register file copy are coupled to only some of the execution units in the first cluster.

6. The data processor of claim 5 further comprising:
 an instruction decoder to decode a plurality of instructions;
 steering logic to determine which of the execution units executes each of the instructions.

7. The data processor of claim 1 further comprising:
 at least one interface to communicate data to and from all copies of the register file;
 memory coupled to the interface to access and store the data;
 at least one input/output device coupled to the interface to provide and accept the data.

8. In a data processor having multiple execution units, a register file comprising:
 first and second register-file copies each having a plurality of multiport registers adapted to respond to a plurality of addresses, a group of local read ports, a group of local write ports, and a group of remote write ports;
 first and second groups of local read connections, each connection in each local read group coupled between one of the execution units in one of the groups and a corresponding port of the group of local read ports in the first of the register-file copies;
 first and second groups of local write connections, each connection in each local write group coupled between the one of the execution units in the first of the groups and a corresponding port of the group of local write ports in the first of the register files;

first and second groups of remote write connections, each connection in each remote write group coupled between one of the a local write port of one of the register-file copies and a corresponding port of the group of remote write ports in the other of the register-file copies.

9. The register file of claim 8 where both of the first and second register-file copies are adapted to respond to the same plurality of addresses.

10. The register file of claim 8 where the first and second register-file copies are adapted to respond to separate subsets of the plurality of addresses, and both of the register-file copies are adapted to respond to a further plurality of the addresses.

11. The register file of claim 8 where the plurality of addresses is divided into a group of local addresses and a group of global addresses.

12. The register file of claim 9 where the remote write ports of both register-file copies respond only to addresses in the global group.

13. The register file of claim 8 where the local write ports of both register-file copies are adapted to respond only to addresses in both the global and the local groups.

14. The register file of claim 8 where the execution units are divided into of clusters, and where the remote write ports of each register-file copy are adapted to respond to less than all of the execution units.

15. The register file of claim 14 where the plurality of addresses is divided into a group of local addresses and a group of global addresses, and where the remote write ports of both register-file copies are adapted to respond only to addresses in the global group.

16. A method, comprising:
  transferring data from first and second register-file copies each having a plurality of addressable multiport registers through a group of local read ports in each register-file copy to in first and second groups, respectively, of a plurality of groups of execution units;
  transferring data from the execution units in the first and second groups through a group of local write ports in the first and second register-file copies, respectively;
  transferring data from at least some of the execution units in the first and second groups through a group of remote write ports in the second and first register-file copies, respectively, in parallel with the previous transferring operation.

17. The method of claim 16 where data from all of the execution units in the first and second groups is transferred through the group of remote write ports in the second and first register-file copies, respectively.

18. The method of claim 16 where data from only a subset of all the execution units in the first and second groups is transferred through the group of remote write ports in the second and first register-file copies, respectively.

19. The method of claim 16 further comprising transferring data between a memory and both the first and second register-file copies.

20. The method of claim 19 where data is transferred between a memory and at least some of the first and second copies of the file registers in parallel.

21. A data processing system, comprising:
  a first copy of a register file having read ports, local write ports, and remote write ports separate from the local write ports of the first copy;
  a second copy of the register file having read ports, local write ports, and remote write ports separate from the local write ports of the second copy;
  a first group of execution units having read ports coupled to the read ports of the first register copy and having write ports coupled to the local write ports of the first register copy and to the remote write ports of the second register copy, adapted to write data to both register-file copies in parallel;
  a second group of execution units having read ports coupled to the read ports of the first register copy and having write ports coupled to the local write ports of the second register copy and to the remote write ports of the first register copy, adapted to write data to both register-file copies in parallel.

22. The system of claim 21 where only some registers of the first and second copies include remote write ports.

23. A method, where:
  a first group of execution units reads data from a first copy of a register file having registers accessed by a plurality of addresses;
  a second group of execution units reads data from a different copy of the register file having physically separate registers accessed by the same plurality of addresses;
  both groups of execution units write the same data to both copies of the register file in parallel.

24. The method of claim 23 where both groups of execution units are adapted to write the same data to only certain ones of the registers in both copies of the register file in parallel.

25. The method of claim 23 where both register copies have a set of read ports and a set of local write ports coupled to the execution units in their own execution-unit group, and a set of remote write ports coupled to the local write ports in the other group.

26. The method of claim 23 where the copies duplicate the entire register file.

27. The method of claim 26 where all addresses of the register file are duplicated in each of the copies.

28. The method of claim 26 where both of the copies hold identical data.

29. The method of claim 23 where only some of the registers in the register file are adapted to write the same data to both copies of the register file in parallel.

* * * * *

UNITED STATES PATENT AND TRADEMARK OFFICE
CERTIFICATE OF CORRECTION

PATENT NO. : 6,629,232 B1
DATED : September 30, 2003
INVENTOR(S) : Rajiv Gupta Harshvardhan Sharangpani and Ken Arora It is certified that error appears in the above-identified patent and that said Letters Patent is hereby corrected as shown below:

<u>Title page, Item [54] and Column 1, line 2,</u>
Title, delete "MANY" and insert -- MULTIPLE -- therefor.

<u>Column 7,</u>
Line 3, delete "a" before "local".
Line 25, delete "of" before "clusters".

Signed and Sealed this

Thirtieth Day of March, 2004

JON W. DUDAS
*Acting Director of the United States Patent and Trademark Office*